Figure 1:
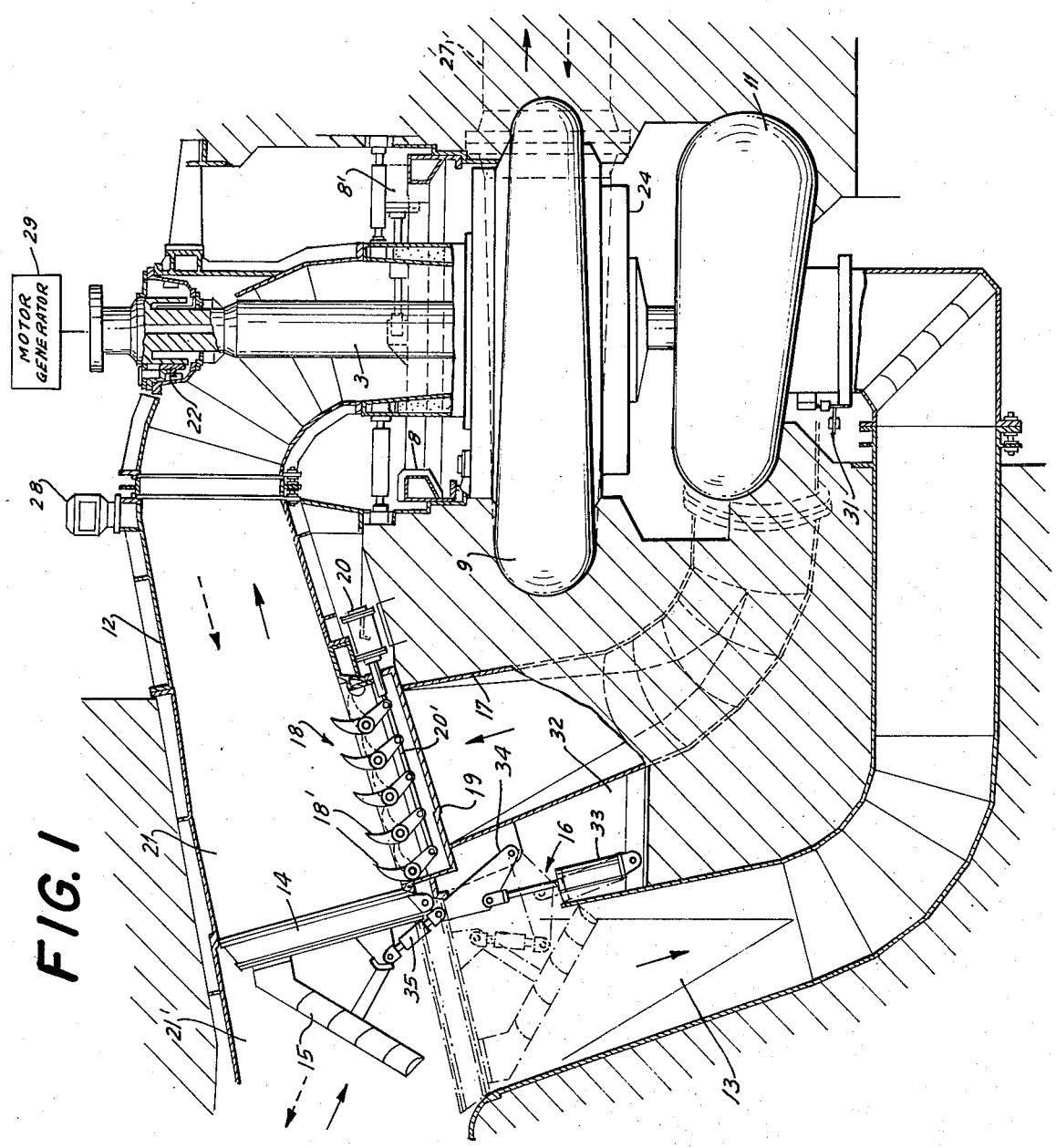

United States Patent [19]

Brcar

[11] 4,217,077
[45] Aug. 12, 1980

[54] TWO-STAGE/SINGLE-STAGE REVERSIBLE PUMP-TURBINE WITH SUPPLYING PUMP

[75] Inventor: Anton Brcar, Ljubljana, Yugoslavia

[73] Assignee: Titovi Zavodi Litostroj Ljubljana n.sol.o., Ljubljana, Yugoslavia

[21] Appl. No.: 878,434

[22] Filed: Feb. 16, 1978

[30] Foreign Application Priority Data

Feb. 21, 1977 [YU] Yugoslavia .................. 475/77

[51] Int. Cl.² ............... F01D 1/30; F01D 15/10
[52] U.S. Cl. ...................... 417/407; 415/123; 415/500; 290/52
[58] Field of Search ............ 415/50, 123; 290/52

[56] References Cited

U.S. PATENT DOCUMENTS

| | | | |
|---|---|---|---|
| 2,246,472 | 6/1941 | Sharp | 415/500 |
| 2,660,033 | 11/1953 | Bowden | 415/123 |
| 3,794,456 | 2/1974 | Jelusic | 290/52 |
| 3,810,717 | 5/1974 | Rarcevic | 415/500 |
| 4,008,010 | 2/1977 | Fauconnet | 415/500 |
| 4,014,624 | 3/1977 | Takase | 415/500 |
| 4,056,330 | 11/1977 | Lieber | 415/500 |

FOREIGN PATENT DOCUMENTS 1047380  11/1966  United Kingdom ............ 290/52

Primary Examiner—William L. Freeh
Attorney, Agent, or Firm—Karl F. Ross

[57] ABSTRACT

In a hydroelectric facility, a vertically mounted rotatable shaft is connected to a motor-generator and carries a pump-turbine with a supplying pump disposed below and immersed in water, the supplying pump disengaging from the shaft when the pump-turbine is driving the motor-generator and engaging the shaft when the motor-generator is driving the pump-turbine and supplying pump, thereby providing a two-stage pumping mode and a single-stage generating mode.

2 Claims, 2 Drawing Figures

TWO-STAGE/SINGLE-STAGE REVERSIBLE PUMP-TURBINE WITH SUPPLYING PUMP

FIELD OF THE INVENTION

The present invention relates, in general, to pump-turbine, and, more specifically, to the construction of a two-stage/single-stage reversible pump-turbine provided with a hydraulically disconnectable supplying pump arranged at the free end of the pump-turbine shaft, for use in hydraulic power stations operating within pressure ranges up to water columns of 700 m.

BACKGROUND OF THE INVENTION

Through the evolution of storage type hydroelectric generating stations which operate at the above pressure ratios it was discovered that at deep submersion, i.e. location of the pump-turbine beneath the lowest water level, which is technically and economically mostly unacceptable, but is necessary for the elimination of cavitation, no reversible single-stage pump-turbine can generally by applied as an independent unit. The reason for this lies in the fact that such a unit cannot be constructed in a manner such that on the one hand the submersion will be acceptable and on the other hand the plant will not be endangered by cavitation, particularly during operation as a storing machine at the given pressure ranges.

In order to overcome these disadvantages, the known embodiments use two-stage pump-turbines with equally divided pressure ratios to each stage. These plants operate satisfactorily with regard to cavitation however, if the first stage operates at a lower pressure, cavitation will occur because the first stage will be driven faster than normal for its pressure by the higher pressure second stage. However, there still exists the disadvantage that no known two-stage plant operating at a pressure usually divided into equal parts also enables obtaining optimum efficiency in both operation as a turbine for driving a generator and as a pump for filling a reservoir. In addition to known reversible two-stage plants there have been proposed multi-stage irreversible plants. The disadvantage of these plants lies in the fact that in order to assure moderate submersion there has to be added a supplying pump to the storing pump. The supplying pump is mounted on the axle of the turbine or storing pump, or it is provided with its own electric drive. A disadvantage of the first embodiment is a lower efficiency of the plant because that together with the main hydraulic pump-turbine, there also rotates the rotor of the supplying pump, the latter rotation actually being useless. A disadvantage of the second embodiment is the arrangement of a separate pump with own drive in circumstances in which the construction of the plant should be compact, and not require more extensive construction entailing higher cost.

OBJECTS OF THE INVENTION

It is therefore an object of the present invention to provide a construction of a two-stage/single-stage reversible pump-turbine which renders the highest efficiency in both operation as a pump and as a turbine regimes at given pressure ratios, at improved situation regarding the cavitation as well as at an admissible submersion. It is another object of the present invention to provide a two-stage/single-stage reversible pump-turbine that will eliminate cavitation.

SUMMARY OF THE INVENTION

The above objects are achieved in a construction of a plant, wherein the rotor of a supplying pump is engaged in the direction of rotation in pump operation of a turbine, which has a common shaft with the supplying pump, the supplying pump being connected to the shaft by means of a freewheel clutch filled with oil, which disengages in the direction of rotation of the shaft in turbine operation, the idle rotor floating in the scroll case of the supplying pump, which is filled with water drawn in through the intake pipe of the supplying pump. By means of a pivotable blocking flap provided with guide ribs and an operating linkage, the intake tube is connected with the main pipe of the plant. A connecting pipe between the scroll case of the supplying pump and the main pipe of the pump-turbine is provided with a Venetian-blind-type sluice for opening and closing the connecting pipe. The rotor blades of the pump-turbine and the rotor blades of the supplying pump are arranged in opposite directions and located in separate scroll cases, which are offset from each other by approximately 180°, the supplying pump being provided with guide vanes at the intake of the rotor to impart a rotation to the incoming water stream and, finally, for radial guiding of rotating elements of both units there is provided a collar bearing arranged at the bend of the main pipe of the pump-turbine, and a guide bearing arranged in the lower end plate of the pump-turbine.

In a two-stage/single-stage high-pressure pump-turbine plant having the features as set forth above there are improved operating results concerning cavitation at relatively small submersion and greater efficiency in both operating modes, the time for changing the operating modes being relatively low because of the fact that the intake and connecting pipes need not be drained. Further advantages of the proposed construction are that the axial forces acting upon the rotating elements upwardly against the suction pipe of the pump-turbine are adjusted by the load on the rotating elements, and further, the axle passing axially through the main pipe enables stabilization of flow conditions at partial loading during turbine operation in the main pipe of the pump-turbine, and the relatively simple mounting, dismounting as well as the eventual ease of repair of the active elements (rotors), which enables an efficient maintenance of the system.

Figure 2:
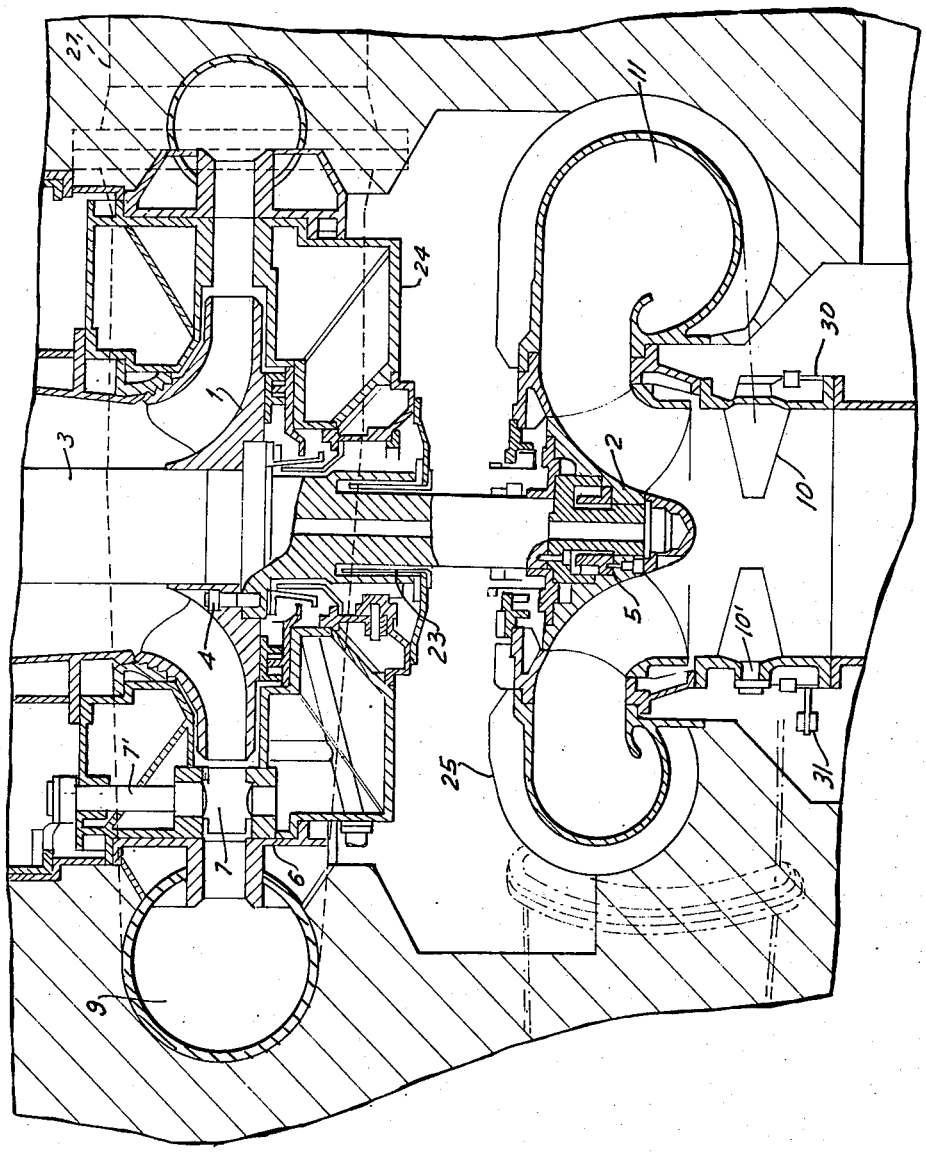

The above and other objects, features and advantages of the invention will become more readily apparent from the following description, reference being made to the accompanying drawing in which:

FIG. 1 is an axial cross-sectional view of the plant according to the invention; and FIG. 2 is a detail view in section of a portion of the plant.

SPECIFIC DESCRIPTION

The rotor 1 of the reversible regulated pump-turbine 24 and the rotor 2 of a supplying pump 25 are mounted on a common shaft 3, which is journaled in bearings 22 and 23, in the rotor 1 being mounted by bolts 4 and the rotor 2 by a freewheel clutch 5 which enables automatic mechanical disconnection in one direction of rotation. The clutch can be the type described at page 8-51 of MECHANICAL ENGINEERS' HANDBOOK, Theodore Baumeister, McGraw-Hill Book Co., N.Y. 1958. The single-stage reversible pump-turbine is further provided with an annular support 6 located inwardly of the scroll case 9 and which carries pivotable guide vanes 7 mounted on axles 7' which are connected to and controlled by an adjusting collar 8, reciprocally rotatable by the piston 8' or separate servomotors which are not shown in the drawing. At its intake 26, the supplying pump 25 is provided with guide vanes 10 mounted on pivots 10' and operable by reciprocally rotatable collar 30, driven through linkage 31 by a piston not shown in the drawing, for the change of the input rotation of the incoming water stream as well as with a scroll case 11 shifted for approximately 180° with respect to the scroll case 9.

From a main pipe 12 of the plant there diverges to the supplying pump 25 an intake pipe 13, the water flow direction being determined by a flap 14 provided with guide ribs 15, in such manner that in the pump operation the flap 14 blocks the main pipe directs the water flow from a section 21' of the main pipe 12 of the plant into the inlet pipe 13 and, in the turbine operation, from the main pipe 21, proximal the pump-turbine, of a section 12 to the section 21'. Consequently, the guide ribs 15 are active only in the pump operation, i.e. in the situation shown with full lines in the drawing. The flap 14 with guide ribs 15 is swung by an automatic blocking linkage 16 generally arranged in a recess 32 close to the inlet pipe 13 and comprising a piston 33 connected to a bellcrank 34 pivotally mounted in recess 32 and connected to flap 14 by an adjustable arm 35.

The main pipe 12 of the plant and the high-pressure side of the supplying pump, i.e. its scroll case 11, are interconnected by a connecting pipe 17. In the pump operation, the waterflow between the connecting pipe 17 and the pipe section 21 of the pump-turbine is controlled by a suitably adjustable Venetian-blind-type sluice 18, which in the case of turbine operation takes the position shown in the drawing with dotted lines and acts as a blockade. The ganged adjusting levers 18 of the sluice 18 are arranged in the axial plane of the main pipe section 21, they being protected against a direct press of waterflow by a profiled box 19 and being moved by a drive piston 20 arranged outside the flow field of the plant and connected to levers 18' by the connecting rod 20'.

In the case of turbine operation the pump-turbine plant operates as a pump-turbine or hydroturbine, respectively, with a direction of rotation opposite the pump rotation and with the waterflow in the direction of the dotted arrows. In the case of pump operation the plant is started for operation in general as follows.

It should be pointed out that the supplying pump 25 is positioned so that it always remains immersed in water and that when the plant is in a pumping mode, driving water through the high-pressure pipe 27 to the storing facility, the pressure ratio of the water being pumped is divided with the lower portion to the pump 25 and the greater portion to the turbine 24. When the plant is in a generating mode, the pump 25 is disengaged and the entire pressure is transferred to the turbine 24, this arrangement being in effect a two-stage system for greater pumping efficiency and a single-stage system for generation without the dangers of cavitation and the efficiency of a disengageable supplying pump.

Before the rotating parts of both units are driven by a common electric motor-generator 29, the flap 14 is swung into the position as drawn with full lines in the drawing in order to separate the pipe section 21' of the plant from the pipe section 21 of the single-stage pump-turbine. The sluice 18 as well as the guide vanes 7 and a high-pressure sluice (not shown) of the plant are closed. Thereby it is supposed that the suction pipe 21 of the suction turbine has been emptied. At operation of the supplying pump 25 the pressure in the connecting pipe 17 is increased, and when a pressure correlating to a predetermined velocity near the nominal velocity is obtained, there is opened according to a program the sluice 18 so that the empty suction side of the pump-turbine is filled up, air being gradually removed through a vent valve 28 arranged at the top curvature of the pipe section 21. In the further process there are according to a program additionally opened the guide vanes 7 and the high-pressure sluice of the plant, which is not shown in the drawing, whereby the full pump flow into high-pressure pipe 27 is achieved and a pressure head of up to 700 m of water is established and stored in a reservoir not shown.

The starting of the machinery in the turbine operation, i.e. in another direction of rotation, is realized in known manner in that the high-pressure sluice of the plant is opened and allows a flow from the pipe 27 into the scroll case 9. By corresponding controlled opening of the guide vanes 7, the high pressure flow drives the rotor 1 in a direction of rotation opposite the rotor 2 of the supplying pump, which is automatically mechanically disconnected by the freewheel clutch 5, the pipe sections 21, 21' of the pump-turbine and the plant being interconneced, and the flap 14 and the sluice 18 are displaced as is diagrammatically shown by dotted lines to block respective pipes 13 and 17. As the rotor 2 of the supplying pump practically stands still, there are no ventilating losses and there no longer exists the necessity for the drainage and the cooling of sealing labyrinths, which is otherwise required by rotation in air of these rotors.

What is claimed is:

1. A reversible pump-turbine for medium and high pressure hydroelectric plants, comprising:
    a vertically mounted rotatable shaft coaxial with said pump-turbine and engaging the rotor thereof;
    a motor-generator connected with the upper end of said shaft;
    a supplying pump disposed below said pump-turbine and engageable with the lower end of said shaft on one direction of the rotation thereof;
    a first conduit opening axially into said pump-turbine;
    a second conduit opening tangentially into said pump-turbine;
    a third conduit communicating between the outlet of said supplying pump and said first conduit;
    a fourth conduit communicating between the inlet of said supplying pump and said first conduit;
    closure means operable between a fourth conduit blocking position when said pump-turbine is driving said motor-generator and a first conduit blocking position when said pump-turbine and said supplying pump are being driven by said motor-generator for directing a water stream into said fourth conduit;
    a sluice in said third conduit operable between a closed position when said pump-turbine is being driven by said motor-generator and an open position when said pump-turbine and said supply pump are being driven by said motor-generator;
    guide means at said inlet of said supplying pump for imparting a rotation to an incoming water stream, said pump-turbine being of the scroll type having a diminishing cross section with a plurality of vanes mounted on said rotor in one direction and at least one vane guide for controlling the flow between said rotor and said scroll, said supplying pump being of the scroll type having a diminishing cross section and oriented 180° opposite to said scroll of said pump-turbine and a plurality of vanes arranged on the rotor thereof in a direction opposite to said vanes of said pump-turbine, said supplying pump being engaged by said shaft when said shaft is being driven by said motor-generator;

a valve provided at the highest point of said first conduit for bleeding air trapped therein at the start of a pumping mode of the system, a portion of said first conduit being coaxial with said shaft and said shaft is mounted in a collar bearing at the point of emergence from said first conduit and in a guide bearing provided in said pump-turbine, said water stream being directed by a plurality of ribs provided on said closure means, said closure means being a pivotable flap operable by a linkage contained in a recess adjacent said fourth conduit; and said sluice is of the Venetian-blind type having a plurality of pivotable blades operable by a drive contained in a recess adjacent said third conduit.

2. The device defined in claim 1 wherein the pressure created by the pump-turbine and supplying pump when driven by the motor-generator during the pumping mode is divided with the greater pressure on the pump-turbine and the lesser pressure on the supplying pump for a two-stage pumping mode and during the generating mode, the entire pressure being applied to the pump-turbine.

* * * * *